Sept. 1, 1925.
H. A. OGLE
TOOL FOR DRESSING GRINDING WHEELS
Filed Aug. 24, 1921
1,552,005
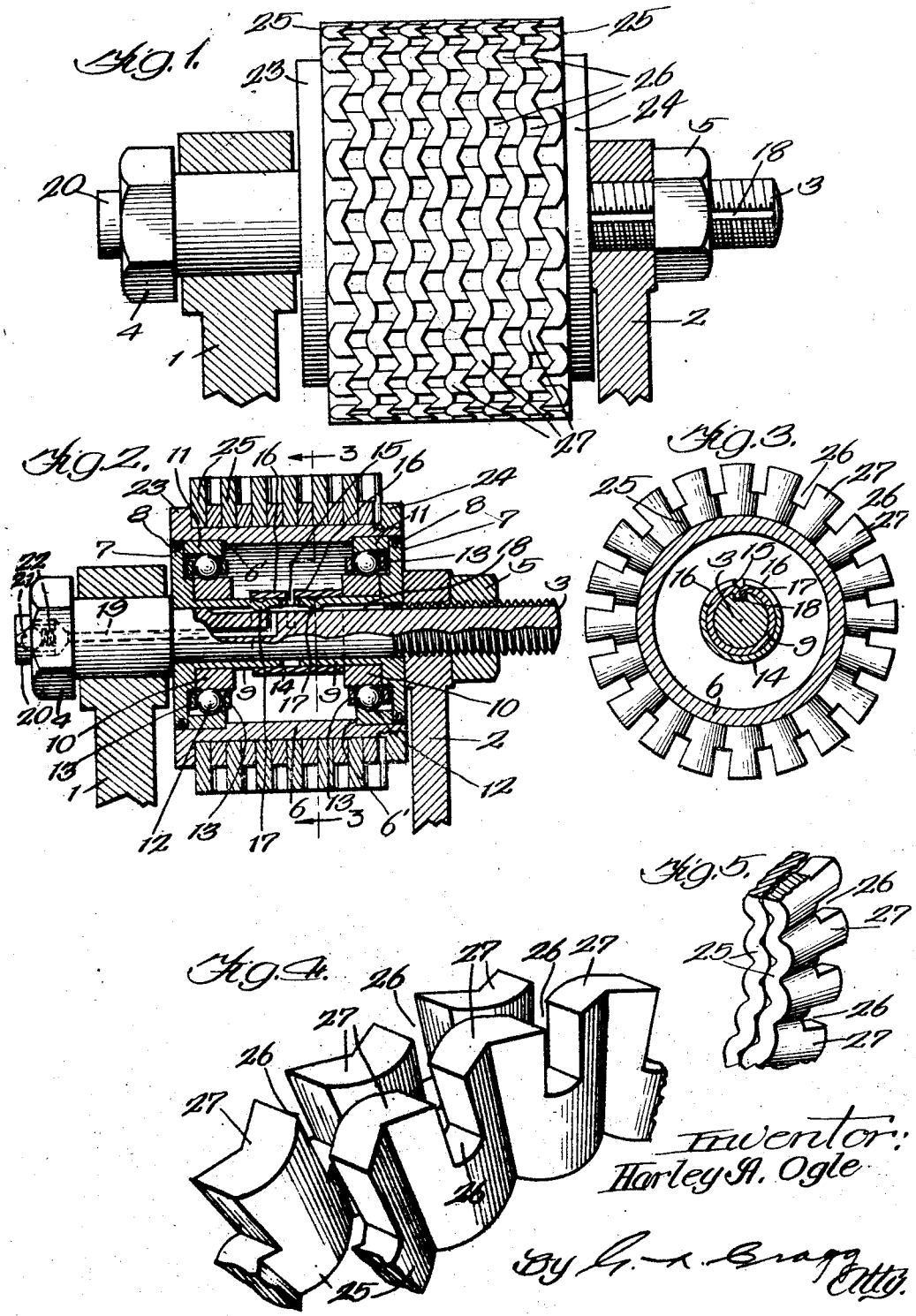
Inventor:
Harley A. Ogle
by G. A. Bragg
Atty.

Patented Sept. 1, 1925.

1,552,005

UNITED STATES PATENT OFFICE.

HARLEY A. OGLE, OF CHICAGO, ILLINOIS.

TOOL FOR DRESSING GRINDING WHEELS.

Application filed August 24, 1921. Serial No. 494,756.

*To all whom it may concern:*

Be it known that I, HARLEY A. OGLE, citizen of the United States, residing at Chicago, in the county of Cook and State of Illinois, have invented a certain new and useful Improvement in Tools for Dressing Grinding Wheels, of which the following is a full, clear, concise, and exact description.

My invention relates to tools for dressing grinding wheels such as emery wheels and employs a plurality of assembled rotatively mounted cutting discs. In accordance with my invention these discs have direct interlocking engagement to prevent their relative rotation whereby it is unnecessary to interpose assembling washers or other assembling devices between adjacent discs. As the invention is preferably practiced the discs are radially corrugated, the corrugations upon each disc intermeshing with the corrugations upon adjacent discs whereby the relative rotation of the discs is prevented. The grinding or dressing peripheral portions of the discs are preferably formed into teeth, though the invention is not to be thus limited. When the teeth are employed radial spaces are formed between adjacent corrugations to form the teeth that are preferably radially disposed and the intertooth spaces in each disc are opposite the teeth of adjacent discs and narrower than such teeth whereby the sides of each tooth of each disc overlap the sides of adjacent teeth of adjacent discs. The discs are desirably positioned to have the corrugations out of which the teeth of each disc are formed reversely positioned with respect to such corrugations of adjacent discs whereby the sides of each tooth upon each disc intermesh with the adjacent sides of adjacent teeth of adjacent discs.

Not only am I able to dispense with assembling devices between adjacent discs of the dressing tool, but the cylindrical dressing face compositely formed of the discs is, as a consequence of my invention, provided with an improved formation and arrangement of cutting edges.

I will explain my invention more fully by reference to the accompanying drawing showing the preferred embodiment thereof and in which Fig. 1 is a view in elevation of the dressing tool with supporting means therefor shown in section; Fig. 2 is a view somewhat similar to Fig. 1 but showing the dressing tool itself in elevation and illustrating a part of the tool mounting in section; Fig. 3 is a sectional view on line 3—3 of Fig. 2; Fig. 4 is a perspective view illustrating the tooth formation and the relative positions of the teeth of two adjacent discs; and Fig. 5 is another perspective view looking from the interior, the discs being preferably in the form of rings to permit of their mounting.

Like parts are indicated by similar characters of reference throughout the different figures.

The drawing illustrates a pair of supports 1, 2 formed with aligned openings which receive a shaft 3. This shaft has a head 4 at one end and is threaded at its other end to receive a nut 5; this nut serving to maintain the assembly of the supports and shaft. A sleeve 6 is suitably mounted with respect to the shaft that passes through the bore of the sleeve. A disc 7 is in each end of said sleeve, each disc being formed with an annular groove in its periphery that receives a ring of felt or other suitable packing material 8 which closes the annular gap between the periphery of such disc and the surrounding inner surface of the sleeve whereby the interior of the sleeve may be made oil tight to contain lubricating oil to lubricate roller bearings that are to be described, the discs 7 being in fluid tight engagement with the shaft 3. The discs 7, the shaft 3, and the sleeve 6 are co-axial. Said discs are formed with co-axial hubs 9 which extend toward each other and are within the bore of the sleeve 6. Bearing raceways 10, preferably separately formed, surround the hubs of the discs and are desirably in tight engagement therewith, these raceways being complemental to raceways 11, also preferably separately formed, which are rigidly assembled with and within the sleeve 6 and are adjacent the ends of said sleeve, each raceway 11 and the disc 7 adjacent thereto being both within the zone of the sleeve at the adjacent end of such sleeve. Rollers 12, preferably in the form of balls, are interposed between the inner and outer raceways whereby the sleeve 6 is rotatively mounted with respect to the shaft 3. Cages 13 serve to confine each set of balls or other rollers. A spring sleeve 14 surrounds and is in gripping engagement with the adjacent ends of the disc hubs 9 whereby these hubs may be held in their relative positions when the shaft 3 is withdrawn. The sleeve 14 is constituted a spring sleeve by means of the slotting 15 which forms spring fingers 16 in the sleeve 14 that press upon the hubs and clamp the hubs between them and the opposite portion of the sleeve 14. The shaft and the discs are in splined connection, this splined connection being preferably effected at the inner ends of the hubs of the discs where the hubs are formed with projections 17 that extend into the bores of the hubs and enter a slot 18 formed in and lengthwise of the shaft 3. By this arrangement the hubs, which are slipped tightly upon the shaft, are prevented from turning with respect thereto while movable longitudinally thereon.

In the process of assembly the raceways 11 are inserted in the cylinder 6 until they engage the shoulders 6' formed on the sleeve 6 and within the bore thereof whereafter one disc 7 is positioned within said sleeve 6. The spring sleeve 14 is then slipped upon the hub 9 of this disc whereafter the other disc 7 is positioned within the sleeve 6, the hub of this latter disc being inserted within the bore of the sleeve 14. When the discs 7 are thus positioned within the sleeve 6 they carry the inner raceways 10, the balls or other rollers 12 and the cage 13 for the balls. If the shaft 3 has but one longitudinal slot 18 the discs 7 are so relatively positioned that the projections 17 are in a line parallel with the axis of the sleeve 6 so that the shaft 3 may be inserted, the shaft being positioned to have its slot 18 in line with said projections 17. The shaft may also be formed with a passage 19 extending from one end thereof toward the middle of the shaft where it is in communication with the bore of the sleeve 6. Oil or other lubricant may be passed between the channel 19 into the interior of the sleeve 6 whereafter the outer end of the passage 19 may be sealed by a plug 20. If desired the plug may be provided with a ball valve 21 normally pressed outwardly by a spring 22 to close the valve.

The construction so far specifically described in connection with the drawing forms the subject matter of my co-pending application Serial No. 494,757, filed August 24, 1921.

The sleeve 6 has a flange 23 at one end and is threaded at the other end to receive a ring 24. The cutting discs 25 have circular holes concentric with their peripheries, these holes being of a size to permit the cutting discs to have snug sliding fit with the sleeve 6. The cutting discs 25 are clamped in place between the shoulder 23 and the ring 24 by screwing said link upon the sleeve and against the cutting discs.

In order to avoid the employment of assembling devices between the cutting discs I so form the discs that they have direct interlocking engagement that serves to prevent their relative rotation. To this end the discs are corrugated radially, the corrugations of adjacent cutting discs being interfitted, the cutting discs being thus incapable of relative rotation when they are clamped in place.

Radial spaces 26 are formed between adjacent corrugations to form radial cutting teeth 27. The cutting discs are positioned to have the corrugations out of which the teeth in each cutting disc are formed reversely positioned with respect to such corrugations on adjacent cutting discs. The spaces 26 are narrow with respect to the width of the teeth 27 whereby the sides of each tooth upon each cutting disc intermesh with the adjacent sides of adjacent teeth of adjacent cutting discs, such adjacent cutting discs being so relatively positioned that the intertooth spaces in each cutting disc are opposite the teeth of adjacent cutting discs. Cutting discs thus formed and assembled produce a multiplicity of cutting edges surrounding enclosed spaces as indicated clearly in Fig. 1. The cutting zones of the teeth in each cutting disc overlap the cutting zones of the teeth of adjacent cutting discs and there are, as well, cutting edges which extend across the face of the dressing tool substantially parallel with the axis thereof. The tool of my invention is simple in construction inasmuch as the cutting discs may be all similarly formed, it being merely necessary to reverse the positions of adjacent discs in order that the teeth thereof may be opposite to and close the remaining sides of the intertooth spaces of adjacent cutting discs.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A wheel dresser including a plurality of assembled rotatively mounted cutting discs which have radial corrugations, the corrugations upon each disc intermeshing with the corrugations upon adjacent discs to prevent relative rotation of the discs, there being radial spaces formed between adjacent corrugations to form radial teeth, the intertooth spaces in each disc being opposite the teeth of adjacent discs and narrower than such teeth whereby the sides of each tooth of each disc overlap the sides of adjacent teeth of adjacent discs.

2. A wheel dresser including a plurality of assembled rotatively mounted cutting discs which have radial corrugations, the corrugations upon each disc intermeshing with the corrugations upon adjacent discs to prevent relative rotation of the discs, there being radial spaces formed between adjacent corrugations to form radial teeth, the discs being positioned to have the corrugations out of which the teeth in each disc are formed reversely positioned with respect to such corrugations of adjacent discs whereby the sides of each tooth upon each disc intermesh with the adjacent sides of adjacent teeth of adjacent discs, the intertooth spaces in each disc being opposite the teeth of adjacent discs.

3. A wheel dresser including a plurality of assembled rotatively mounted cutting discs which have radial corrugations, the corrugations upon each disc intermeshing with the corrugation upon adjacent discs to prevent relative rotation of the discs, there being radial spaces formed between adjacent corrugations to form radial teeth, the discs being positioned to have the corrugations out of which the teeth in each disc are formed reversely positioned with respect to such corrugations of adjacent discs whereby the sides of each tooth upon each disc intermesh with the adjacent sides of adjacent teeth of adjacent discs.

In witness whereof, I hereunto subscribe my name this first day of July, A. D. 1921.

HARLEY A. OGLE.